US012562538B2

(12) United States Patent

Ito et al.

(10) Patent No.: US 12,562,538 B2

(45) Date of Patent: Feb. 24, 2026

(54) SHIELDED TERMINAL

(71) Applicant: SUMITOMO WIRING SYSTEMS, LTD., Mie (JP)

(72) Inventors: Yusuke Ito, Mie (JP); Tomoaki Yasuda, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 499 days.

(21) Appl. No.: 17/989,087

(22) Filed: Nov. 17, 2022

(65) Prior Publication Data

US 2023/0163539 A1 May 25, 2023

(30) Foreign Application Priority Data

Nov. 24, 2021 (JP) ................................ 2021-190337

(51) Int. Cl.

*H01R 24/54* (2011.01)
*H01R 9/05* (2006.01)
*H01R 24/22* (2011.01)

(52) U.S. Cl.

CPC .......... *H01R 24/545* (2013.01); *H01R 24/22* (2013.01); *H01R 9/0518* (2013.01)

(58) Field of Classification Search

CPC ..... H01R 9/0518; H01R 24/545; H01R 24/22
See application file for complete search history.

(56) References Cited

U.S. PATENT DOCUMENTS

| | | | | |
|---|---|---|---|---|
| 6,503,100 B2 * | 1/2003 | Yamane | H01R 4/023 439/582 |
| 7,207,839 B1 * | 4/2007 | Shelly | H01R 4/2495 439/585 |
| 8,262,409 B2 * | 9/2012 | Chang | H01R 24/545 439/582 |

FOREIGN PATENT DOCUMENTS

| | | |
|---|---|---|
| JP | H08-153557 A | 6/1996 |
| JP | H09-120870 A | 5/1997 |
| JP | 2014-107139 A | 6/2014 |
| JP | 2014-107140 A | 6/2014 |

* cited by examiner

*Primary Examiner* — Renee S Luebke
*Assistant Examiner* — Paul D Baillargeon
(74) *Attorney, Agent, or Firm* — Venjuris, P.C.

(57) ABSTRACT

An outer conductor 13 includes a connection member 23 and an attachment member 24, 24A that is separate from the connection member 23. The connection member 23 includes a tubular part 25 and an extension part 26 that extends in a direction crossing the tubular part 25. The attachment member 24, 24A includes a crimp part 59, 59A that covers an outer surface of the extension part 26 and is crimped to the shielded electrical wire 90, 90A with the extension part 26 interposed therebetween. The extension part 26 and the tubular part 25 form an L shape in a side view, and are continuous with each other via an inner corner part 36 formed between outer surfaces of the extension part 26 and the tubular part 25.

8 Claims, 12 Drawing Sheets

SHIELDED TERMINAL

CROSS-REFERENCE TO RELATED APPLICATIONS

This application is based on and claims priority from Japanese Patent Application No. 2021-190337, filed on Nov. 24, 2021, with the Japan Patent Office, the disclosure of which is incorporated herein in its entirety by reference.

TECHNICAL FIELD

The present disclosure relates to a shielded terminal.

BACKGROUND

JP 2014-107140A discloses a shielded terminal that is called a connection terminal. The shielded terminal has a connection part and a terminal part, and has an L shape in a side view. The connection part has an external conductor crimp barrel part and an insulator surrounding part. The terminal part has a cylindrical terminal external conductor. The external conductor crimp barrel part, the insulator surrounding part, and the terminal external conductor constitute the outer conductor of the shielded terminal. The external conductor crimp barrel part is bent into a tubular shape when the external conductor (shield part) of a coaxial cable (shielded electrical wire) is crimped. This forms a gap at an inner corner part between the leading end of the external conductor crimp barrel part and the terminal external conductor. JP 2014-107139A, JP 9-120870A, and JP 8-153557A also disclose techniques related to shielded terminals.

SUMMARY

In the case of JP 2014-107140A, there is a concern that high-frequency signals may cause the outflow and inflow of noise through the gap at the inner corner part of the external conductor and deteriorate shielding performance. In addition, since the barrel shape of the external conductor crimp barrel part and the tubular shape of the terminal external conductor need to be formed into one external conductor, there arises a problem in which the degree of freedom in forming is limited.

In view of this, an object of the present disclosure is to provide a shielded terminal with which the shielding performance and the degree of freedom in forming can be increased.

The present disclosure relates to a shielded terminal including an outer conductor connected to a shield part of a shielded electrical wire, wherein the outer conductor includes a connection member and an attachment member that is separate from the connection member, the connection member includes a tubular part and an extension part that extends in a direction intersecting the tubular part, the attachment member includes a crimp part that is crimped to the shielded electrical wire with the extension part interposed therebetween while covering an outer surface of the extension part, and the extension part and the tubular part form an L shape in a side view, and are continuous with each other via an inner corner part formed between outer surfaces of the extension part and the tubular part.

According to the present disclosure, it is possible to provide a shielded terminal with which the shielding performance and the degree of freedom in forming can be increased.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
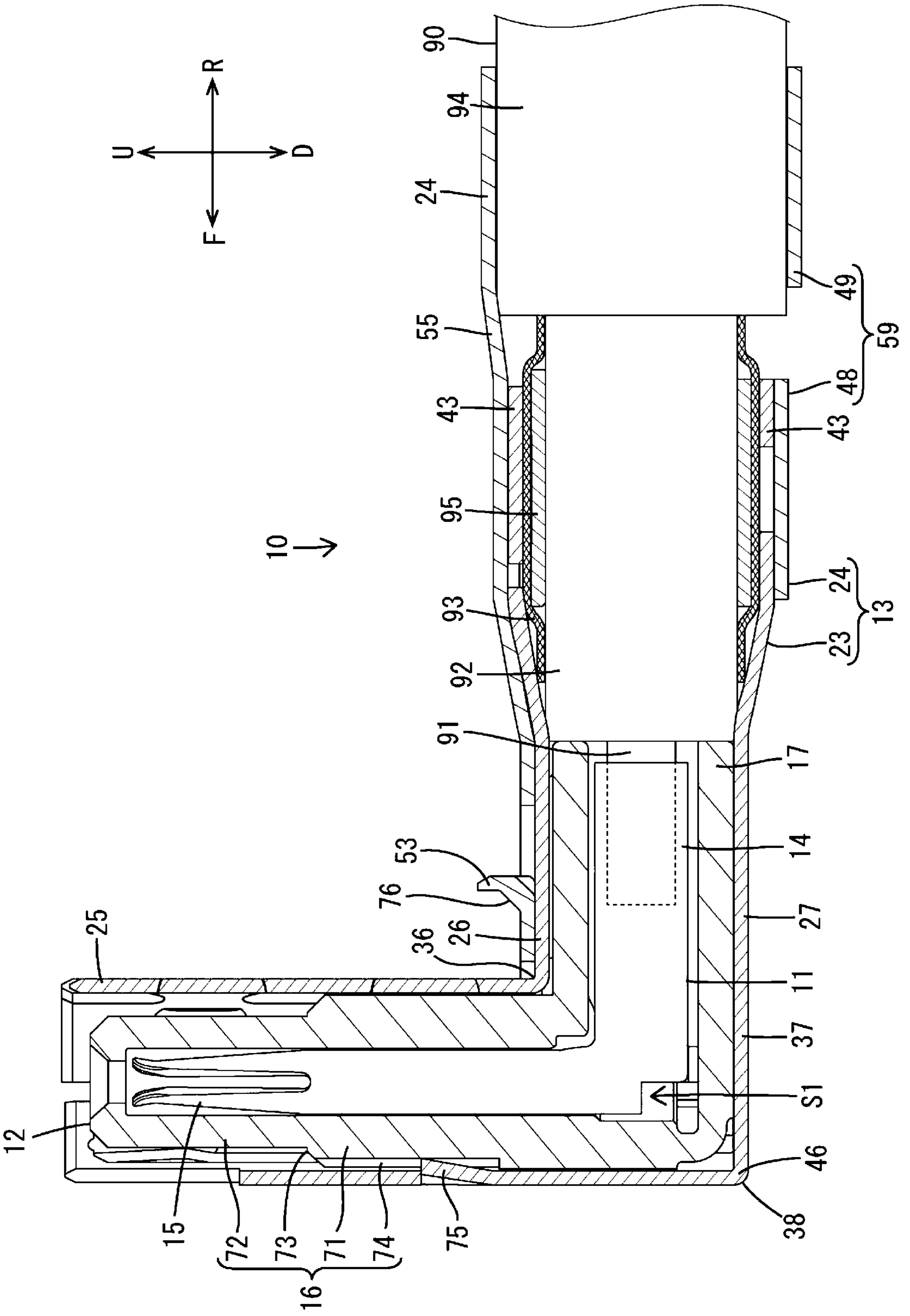
FIG. 1 is a cross-sectional view of a shielded terminal connected to a shielded electrical wire in a first embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

First, embodiments of the present disclosure will be listed and described.

(1) A shielded terminal of the present disclosure is a shielded terminal including an outer conductor connected to a shield part of a shielded electrical wire, wherein the outer conductor includes a connection member and an attachment member that is separate from the connection member, the connection member includes a tubular part and an extension part that extends in a direction intersecting the tubular part, the attachment member includes a crimp part that is crimped to the shielded electrical wire with the extension part interposed therebetween while covering an outer surface of the extension part, and the extension part and the tubular part form an L shape in a side view, and are continuous with each other via an inner corner part formed between outer surfaces of the extension part and the tubular part.

According to the foregoing configuration, the extension part and the tubular part are continuous with each other via the inner corner part and no gap is formed at the inner corner part, and thus it is possible to improve the shielding performance. Since the attachment member has the crimp part and the connection member has the tubular part, it is possible to improve the degree of freedom in forming of the crimp part and the tubular part in comparison to the case where the crimp part and the tubular part are formed in one external conductor.

(2) It is preferable that the crimp part includes a base part that is in contact with the outer surface of the extension part and a barrel that protrudes from the base part and surrounds the shielded electrical wire, and a side of the base part on which the barrel is positioned and a side of the base part on which the tubular part is positioned are opposite to each other.

According to the foregoing configuration, it is possible to avoid the interference between a die for deforming the barrel and the tubular part in the course of crimping of the crimp part to the shielded electrical wire.

(3) It is preferable that the connection member includes, separate to the extension part, an interposing part that is bent and connected to the tubular part and is sandwiched between the shielded electrical wire and the crimp part, and the crimp part includes a blocking part that closes a gap formed between the extension part and the interposing part.

According to the foregoing configuration, the gap between the extension part and the interposing part can also be closed by the blocking part of the attachment member, and thus the shielding performance can be further improved.

(4) It is preferable that an insulating dielectric body is disposed between the outer conductor and the inner conductor, the dielectric body includes an insertion part that is disposed inside the tubular part and a dielectric body part that extends in a direction intersecting the insertion part and is disposed along the extension part, the connection member includes an opposing extension part at a position opposing the extension part, the opposing extension part and the tubular part form an L shape in a side view and are continuous via an outer corner part formed between outer surfaces of the opposing extension part and the tubular part, and the opposing extension part is capable of pivoting to an open position and a closed position around the outer corner part with respect to the tubular part, the inside of the tubular part is open at the open position, and the dielectric body part is sandwiched between the opposing extension part and the extension part at the closed position.

According to the foregoing configuration, when the opposing extension part is at the open position, the insertion part of the dielectric body can be inserted into the tubular part and the dielectric body part can be supported by the extension part. When the opposing extension part is at the closed position, the dielectric body part is sandwiched between the opposing extension part and the extension part. Further, the crimp part is crimped to the shielded electrical wire so that displacement of the opposing extension part to the open position is regulated. At the same time, detachment of the dielectric body from the outer conductor is also regulated.

DETAILS OF EMBODIMENTS OF PRESENT DISCLOSURE

Specific examples of the present disclosure will be described below with reference to the drawings. It should be noted that the present invention is not limited to the examples herein, but rather is indicated by the scope of claims, and is intended to include all modifications within a meaning and scope equivalent to the scope of claims.

First Embodiment

As shown in FIG. 1, a shielded terminal 10 in a first embodiment of the present disclosure includes a conductive inner conductor 11, an insulative dielectric body 12, and a conductive outer conductor 13. The dielectric body 12 is disposed between the inner conductor 11 and the outer conductor 13 to electrically insulate the inner conductor 11 and the outer conductor 13 from each other. The shielded terminal 10 is connected to a terminal part of a shielded electrical wire 90. In the following description, for the front-rear direction, the left side of FIG. 1 is defined as the front side. The front side is the leading end side of the shielded electrical wire 90 in the length direction thereof, and is indicated with reference sign F in the drawings. The rear side is opposite to the front side, and is indicated with reference sign R in the drawings. For the vertical direction, the upper side of FIG. 1 is defined as the upper side. The upper side is the side of connection to a counterpart shielded terminal (not shown), and is indicated with reference sign U in the drawings. The lower side is opposite to the upper side, and is indicated with reference sign D in the drawings. These directions are merely defined for the convenience of description and are not intended to limit the mode of usage.

Shielded Electrical Wire

As shown in FIG. 1, the shielded electrical wire 90 is a coaxial cable and has a core wire 91, a coating part 92, a shield part 93, and a sheath 94. The core wire 91 is a conductor that transmits high-frequency signals. The coating part 92 is an insulation resin coating that covers the outer circumference of the core wire 91. The shield part 93 is a braided wire that covers the outer circumference of the coating part 92. The shield part 93 may have a structure where a metallic foil such as a copper foil, a gold foil, or an aluminum foil is added to a braided wire. The sheath 94 is an insulation resin coating that covers the outer circumference of the shield part 93. At the terminal part of the shielded electrical wire 90, the sheath 94 is removed to expose the shield part 93, and the coating part 92 is removed to expose the core wire 91. A cylindrical conductive sleeve 95 is interposed between the exposed shield part 93 and the coating part 92.

Inner Conductor

The inner conductor 11 is integrally formed by bending a metal plate or the like. As shown in FIG. 1, the inner conductor 11 has an L shape in a side view, and has a core wire crimp part 14 on the rear side and a counterpart inner conductor connection part 15 that extends vertically on the front side. The core wire crimp part 14 is crimped and electrically connected to the core wire 91 of the shielded electrical wire 90. The counterpart inner conductor connection part 15 is in contact with and electrically connected to the counterpart inner conductor of the counterpart shielded terminal (not shown).

Dielectric Body

Figure 2:
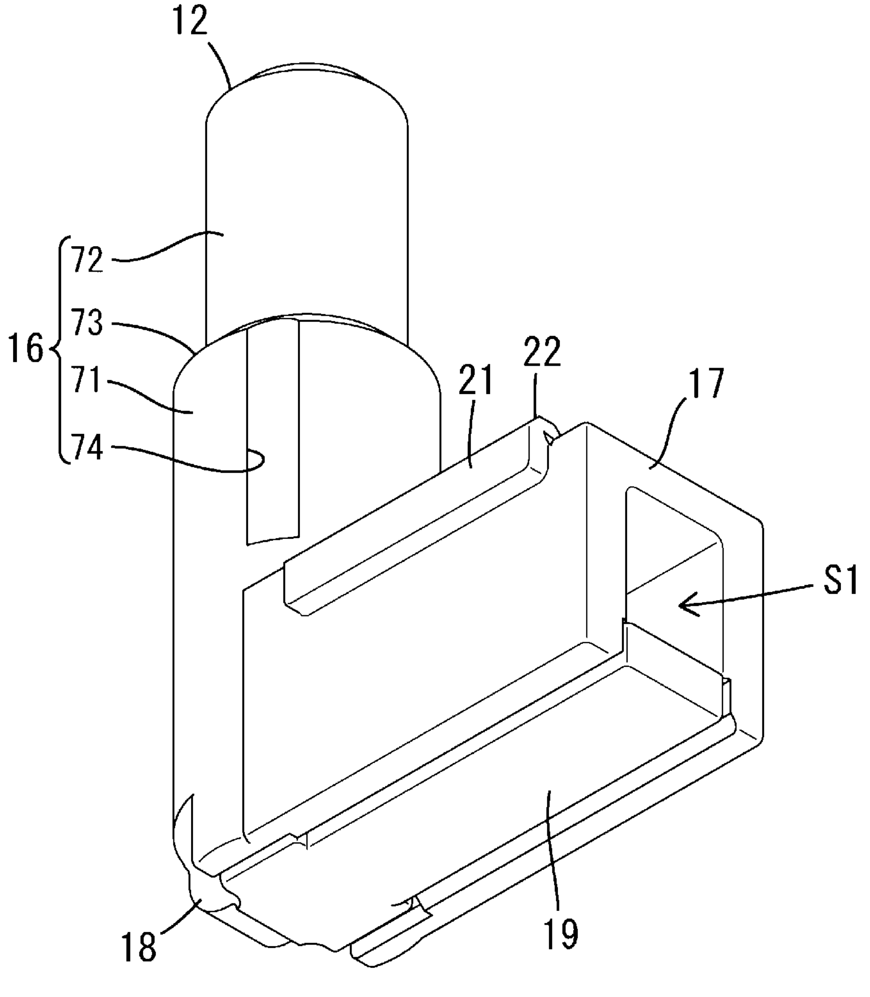
FIG. 2 is a perspective view of a dielectric body.

As shown in FIGS. 1 and 2, the dielectric body 12 is made of a synthetic resin, has an L shape in a side view, and has an insertion part 16 that extends along the vertical direction and a dielectric body part 17 that extends along the front-rear direction. The insertion part 16 has a cylindrical shape in which the counterpart inner conductor connection part 15 of the inner conductor 11 is housed. The insertion part 16 has a lower part 71 positioned on the lower side, an upper part 72 positioned on the upper side, and a step part 73 positioned between the upper part 72 and the lower part 71. The upper part 72 has a smaller diameter than the lower part 71 via the step part 73. The outer circumferential surface of the lower part 71 is provided with a groove 74 that extends vertically. The upper end of the groove 74 is open to the step part 73. The dielectric body part 17 has an angular tubular part and houses the core wire crimp part 14 of the inner conductor 11.

The front part of the dielectric body part 17 is coupled to the rear part of the insertion part 16. As shown in FIG. 1, the dielectric body part 17 and the insertion part 16 are in internal communication with each other and form an inner conductor housing space 51 with an L shape in a side cross-sectional view.

As shown in FIG. 2, a lower wall 19 of the dielectric body part 17 is coupled to the lower front end part of the insertion part 16 via a hinge part 18, and is openable and closable around the hinge part 18. When the lower wall 19 of the dielectric body part 17 is open, the lower side of the insertion part 16 is open such that the counterpart inner conductor connection part 15 can be inserted into the insertion part 16 from below.

Figure 10:
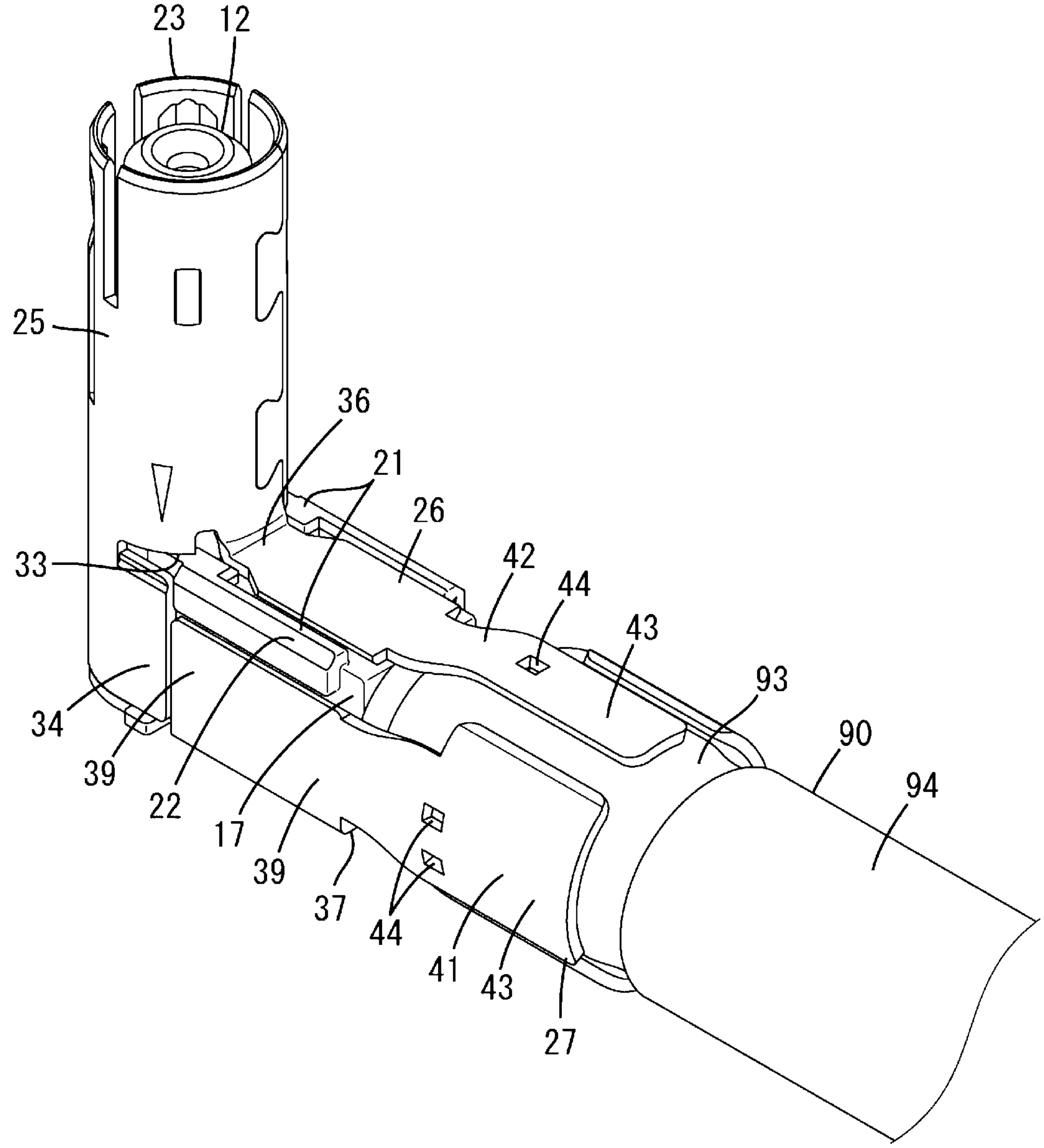
FIG. 10 is a perspective view of the connection member in which the interposing part is at the closed position with respect to the tubular part and the shielded electrical wire has been pulled out of the dielectric body.

As shown in FIG. 10, a pair of rib-shaped engaging parts 21 extending in the front-rear direction are respectively provided at upper left and right corner parts of the dielectric body part 17. Inclined surface parts 22 inclined by chamfering corner parts of the engaging parts 21 are formed on the outer surfaces of the engaging parts 21, respectively.

Outer Conductor

The outer conductor 13 is integrally formed by bending one metal plate. As shown in FIG. 1, the outer conductor 13 has an L shape as a whole in a side view and has a connection member 23 and an attachment member 24. The connection member 23 and the attachment member 24 are separate members that are separable from each other.

Figure 8:
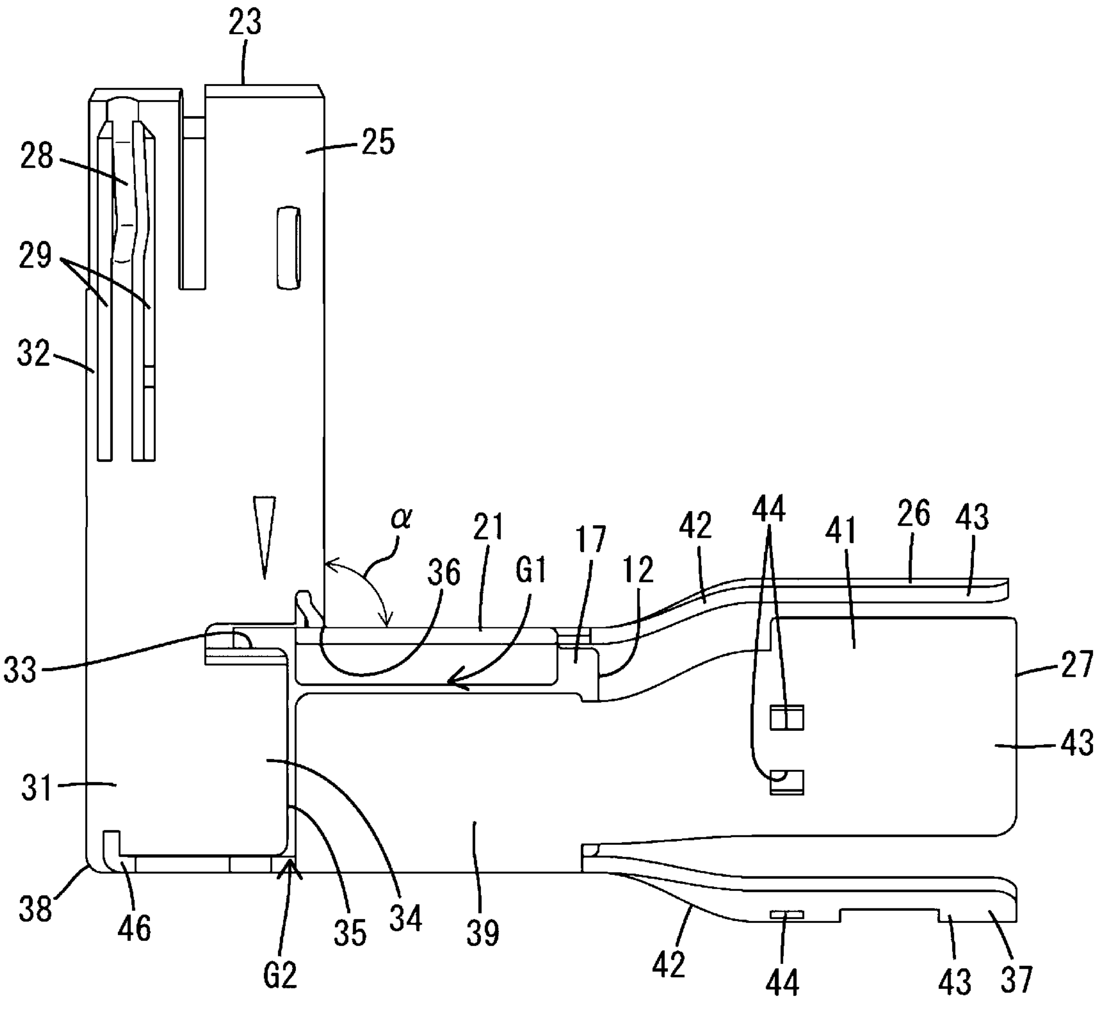
FIG. 8 is a side view showing a state in which the interposing part has shifted from the state in FIG. 7 to a closed position with respect to the tubular part.

As shown in FIG. 8, the connection member 23 has an L shape in a side view at the later-described closed position, and has a cylindrical tubular part 25, a plate piece-like extension part 26 intersecting and connected to the tubular part 25, and an interposing part 27. In the following description of the connection member 23, the front-rear direction and the vertical direction are defined with reference to a state in which the connection member 23 is at the later-described closed position (the state shown in FIG. 8) unless otherwise specified.

The tubular part 25 is disposed with the axial center thereof oriented in the vertical direction. The counterpart outer conductor of the counterpart shielded terminal (not shown) is inserted into the tubular part 25 from above.

An upper part 32 of the tubular part 25 is provided with a plurality of elastic contact parts 28 (only one is shown in FIG. 8). The elastic contact parts 28 are arranged spaced apart from each other in a circumferential direction of the tubular part 25. The elastic contact parts 28 are formed so as to be capable of bending and deforming between slits 29 on two sides thereof in the tubular part 25. The elastic contact parts 28 each protrude to the inside of the tubular part 25 and have a contact point portion that is contactable with the counterpart outer conductor of the counterpart shielded terminal. A protrusion 75 shown in FIG. 1 is formed on the front side of the upper part 32 of the tubular part 25, below the elastic contact parts 28. The protrusion 75 is cut and raised inward from a portion of the tubular part 25 and is inclined rearward while extending upward. The protrusion 75 can be fitted into the groove 74 of the dielectric body 12.

Figure 3:
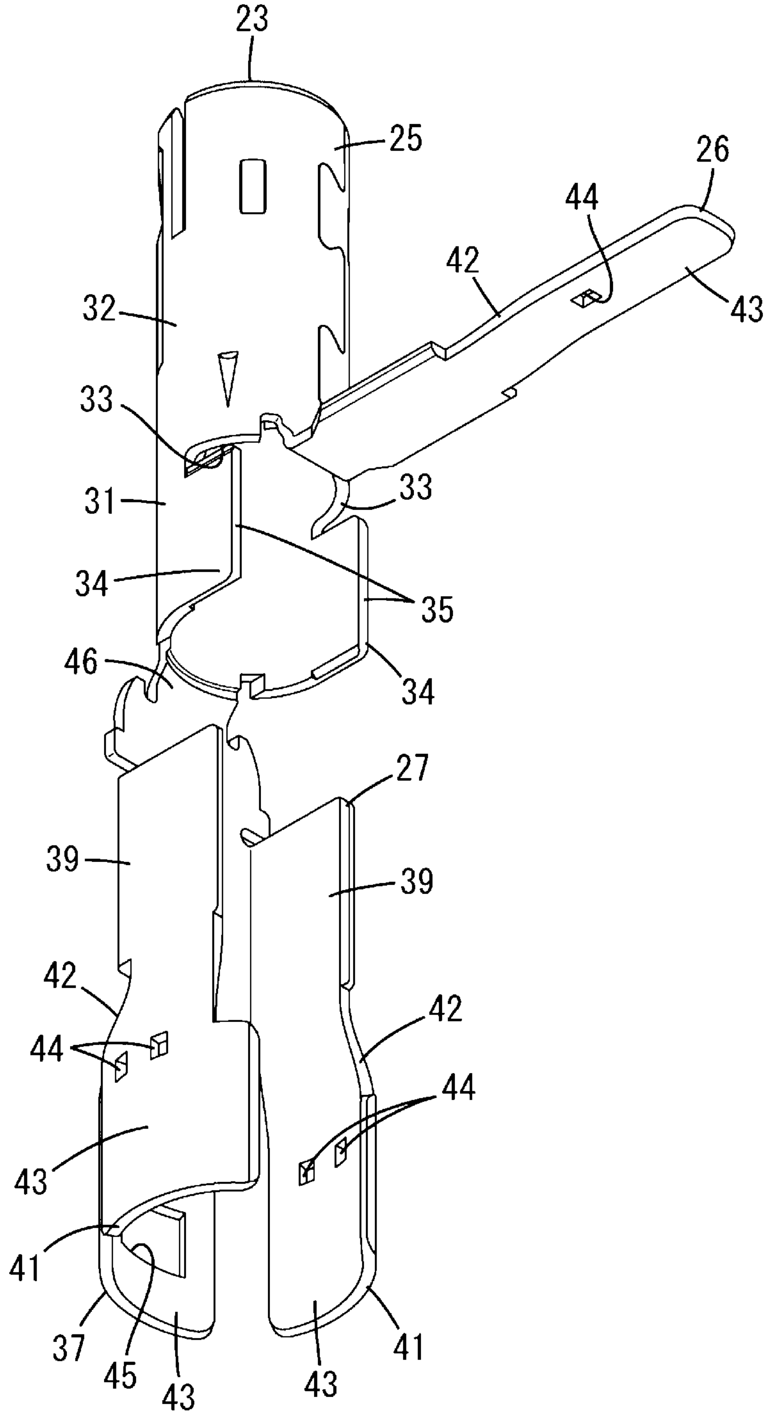
FIG. 3 is a perspective view of a connection member in which an interposing part is at an open position with respect to a tubular part.
Figure 4:
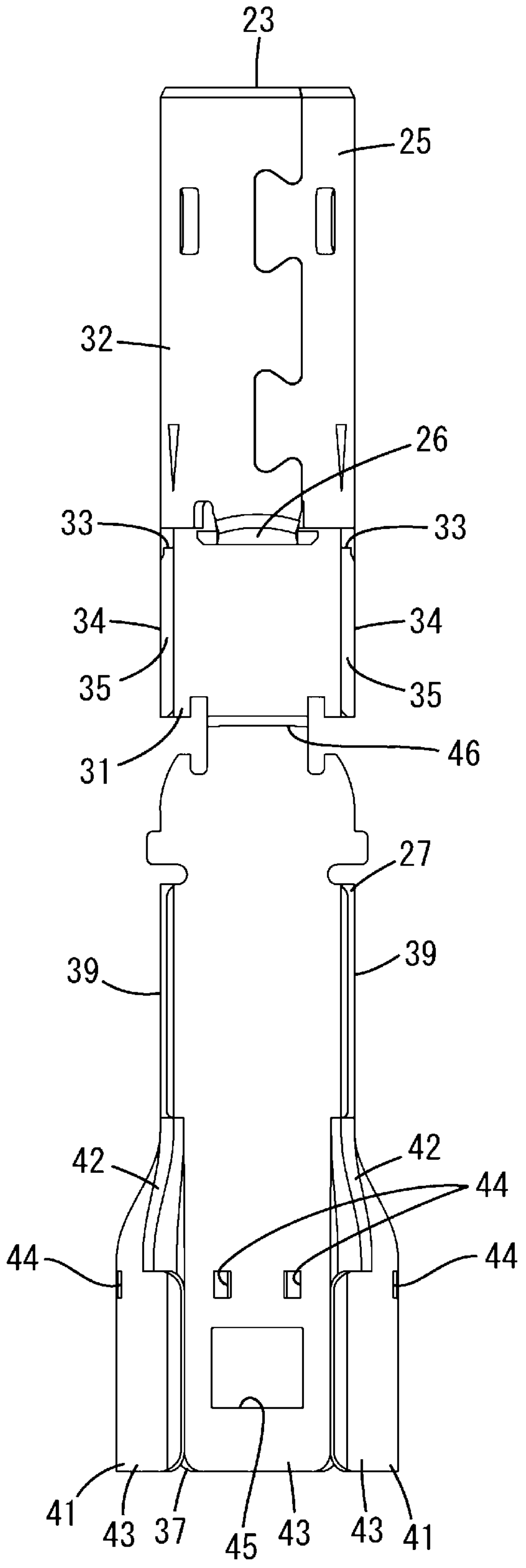
FIG. 4 is a rear view of the state shown in FIG. 3.

As shown in FIG. 3, a lower part 31 of the tubular part 25 has an arc-shaped cross section, is open rearward at the closed position, and is open both rearward and downward at the later-described open position (the state shown in FIG. 3). As shown in FIGS. 3 and 4, a pair of left and right engagement recessed parts 33 are formed between the lower part 31 of the tubular part 25 and the upper part 32 of the tubular part 25. The engagement recessed parts 33 extend along the front-rear direction and are open rearward. The lower part 31 of the tubular part 25 is provided with a pair of left and right engagement parts 34, below the engagement recessed parts 33. The engagement parts 34 are capable of bending and deforming in the horizontal direction (inward and outward directions). The engagement parts 34 each have an open end 35 that extends along the vertical direction at the rear end thereof.

The extension part 26 is formed so as to be bent extending rearward from the lower rear end part of the upper part 32 of the tubular part 25. The extension part 26 is disposed above the open ends 35 of the engagement parts 34. As shown in FIG. 8, the upper part 32 of the tubular part 25 and the extension part 26 form an L shape in a side view and are continuously connected via an inner corner part 36 that is a corner part on the inner side of the L shape. The inner corner part 36 has an intersection angle in a side view $\alpha$($0°<\alpha<180°$, preferably $80°<\alpha<100°$, more preferably $\alpha=90°$) between the outer surface (upper surface) of the extension part 26 and the outer surface (rear surface) of the tubular part 25.

As shown in FIG. 3, the interposing part 27 is integrally coupled to the lower end of the lower part 31 of the tubular part 25. The interposing part 27 has an opposing extension part 37 that is bent so as extend rearward from the lower end of the lower part 31 at the closed position shown in FIG. 8. The opposing extension part 37 is disposed below the extension part 26 so as to oppose the extension part 26. The dielectric body part 17 is disposed so as to be sandwiched between the opposing extension part 37 and the extension part 26.

The opposing extension part 37 is disposed on the lower side relative to the open ends 35 of the engagement parts 34. The opposing extension part 37 and the tubular part 25 form an L shape in a side view, and are continuously connected via an outer corner part 38 that is a corner part on the outer side of the L shape. The outer corner part 38 is formed between the outer surface (lower surface) of the opposing extension part 37 and the outer surface (front surface) of the tubular part 25.

As shown in FIGS. 3 and 4, the interposing part 27 has a pair of side wall parts 39 that are bent so as to rise from left and right side edges of an intermediate part of the opposing extension part 37 in the front-rear direction. As shown in FIG. 8, the front ends of the side wall parts 39 are disposed along the vertical direction so as to oppose the open ends 35 of the engagement parts 34 in parallel at the closed position. A gap G1 is formed between the upper ends of the side wall parts 39 and later-described lateral extension parts 41 and the left and right side edges of the extension part 26.

The interposing part 27 also has a pair of the lateral extension parts 41 that respectively extend rearward from the rear ends of the side wall parts 39. As shown in FIGS. 3 and 4, the lateral extension parts 41 include a pair of inclined parts 42 that are inclined so as to expand rearward, and a pair of electrical wire holding parts 43 that extend from the inclined part 42 to the rear end of the interposing part 27 spaced apart from each other by a certain distance in the horizontal direction. Similarly, as shown in FIG. 8, the extension part 26 and the opposing extension part 37 include a pair of inclined parts 42 that are inclined so as to expand rearward and a pair of electrical wire holding parts 43 that extend from the inclined parts 42 to the rear end of the interposing part 27 spaced apart from each other by a certain distance in the vertical direction.

Figure 9:
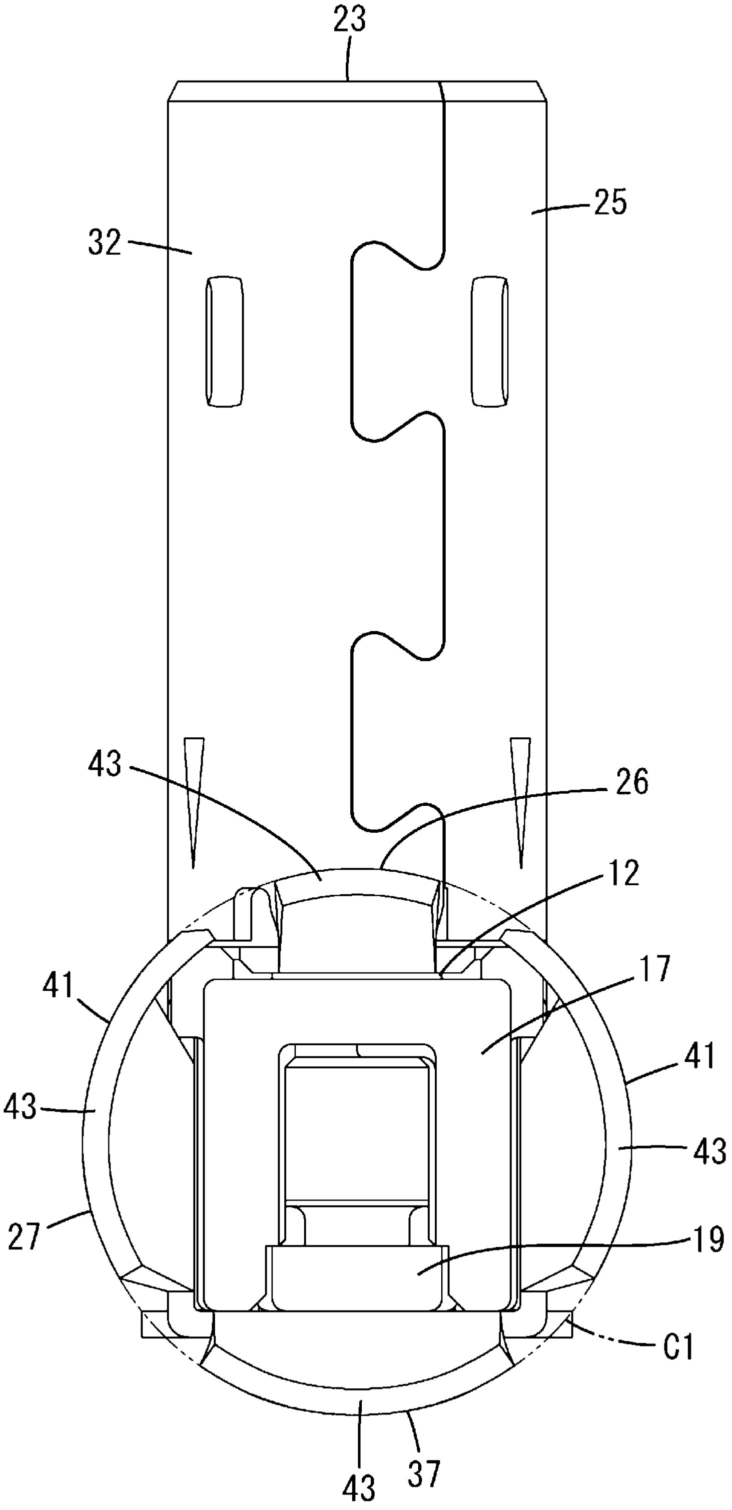
FIG. 9 is a rear view of the state in FIG. 8.

The electrical wire holding parts 43 each have an arc-shaped cross section and are disposed along the outer peripheral surface of the shield part 93 of the shielded electrical wire 90. As shown in FIG. 9, a virtual circle C1 can be formed by joining the electrical wire holding parts 43. The electrical wire holding parts 43 change the inner diameter of the virtual circle C1 in response to bending and deforming of the extension part 26, the opposing extension part 37, and the lateral extension parts 41. The virtual circle C1 is reduced in diameter in the course of crimping of a later-described crimp part 59.

As shown in FIG. 4, each electrical wire holding parts 43 has stopper holes 44 that have a rectangular cross section and are spaced apart in a circumferential direction while extending therethrough. The shield part 93 of the shielded electrical wire 90 can be locked by biting into the stopper holes 44. The electrical wire holding part 43 of the opposing extension part 37 has a lock hole 45 with a rectangular cross section while extending therethrough. The lock hole 45 is formed rearward of the stopper holes 44 and has a larger opening diameter than the stopper holes 44. Lock pieces 56 shown in FIG. 6 can be fitted and locked to the lock hole 45.

Figure 7:
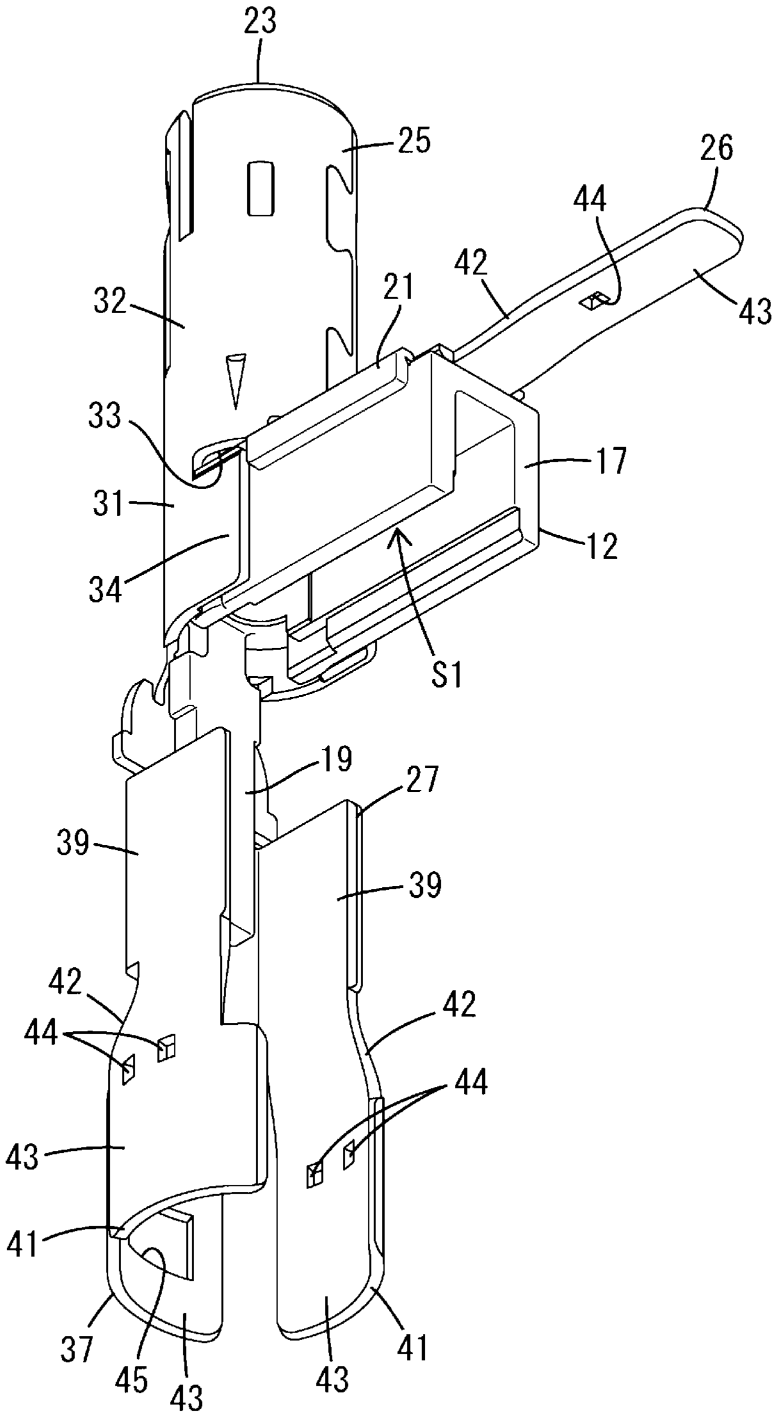
FIG. 7 is a perspective view showing a state in which the dielectric body is attached to the connection member in which the interposing part is at an open position with respect to the tubular part.

As shown in FIG. 1, the outer corner part 38 described above is formed at a pivot center part 46 that connects the interposing part 27 and the tubular part 25. As shown in FIGS. 3 and 4, the pivot center part 46 has a flexible band shape. The interposing part 27 is capable of pivoting around the pivot center part 46 between the open position (the state shown in FIGS. 3, 4, and 7) and the closed position (the state shown in FIGS. 1, 8, and 9 to 11) with respect to the tubular part 25. At the open position, the interposing part 27 is disposed along the vertical direction and the lower sides of the tubular part 25 and the extension part 26 are open. At the closed position, the interposing part 27 is disposed along the front-rear direction and the lower sides of the tubular part 25 and the extension part 26 are closed by the opposing extension part 37.

Figure 5:
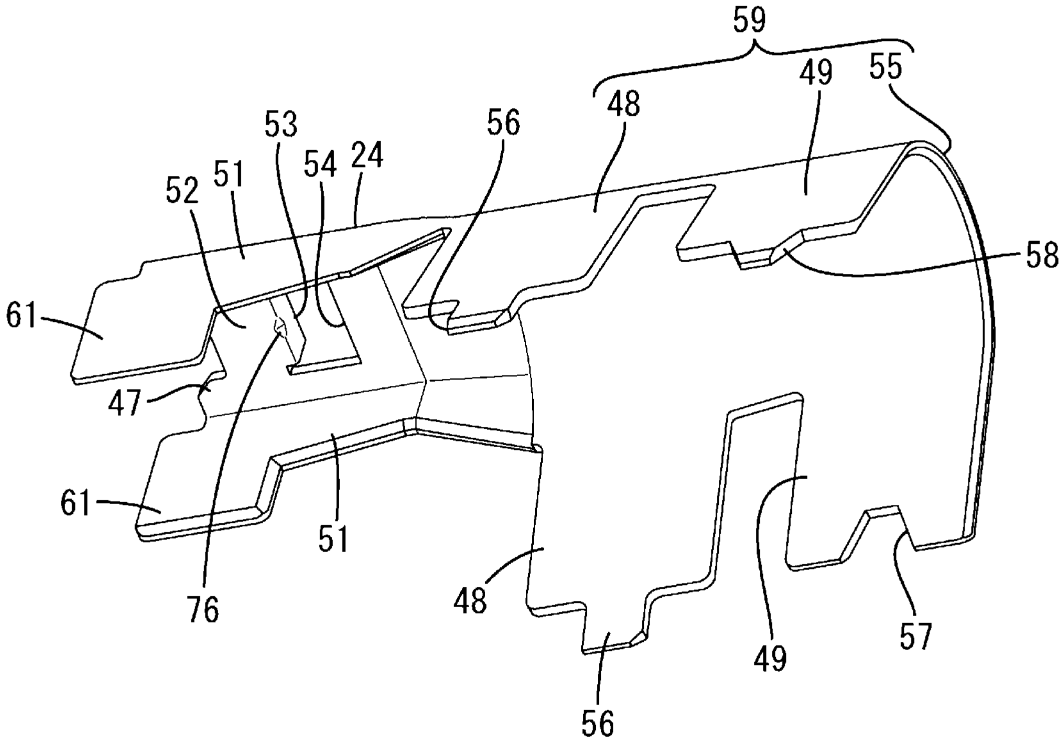
FIG. 5 is a perspective view of an attachment member.
Figure 6:
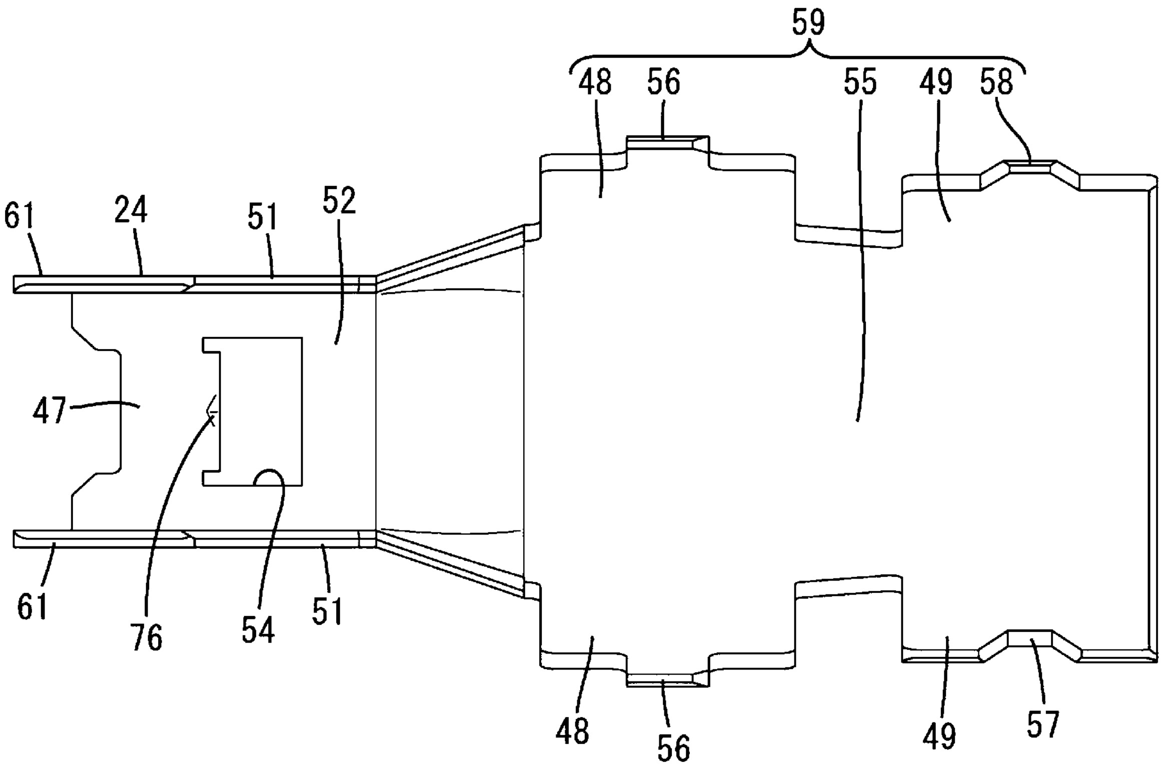
FIG. 6 is a bottom view of the attachment member.
Figure 11:
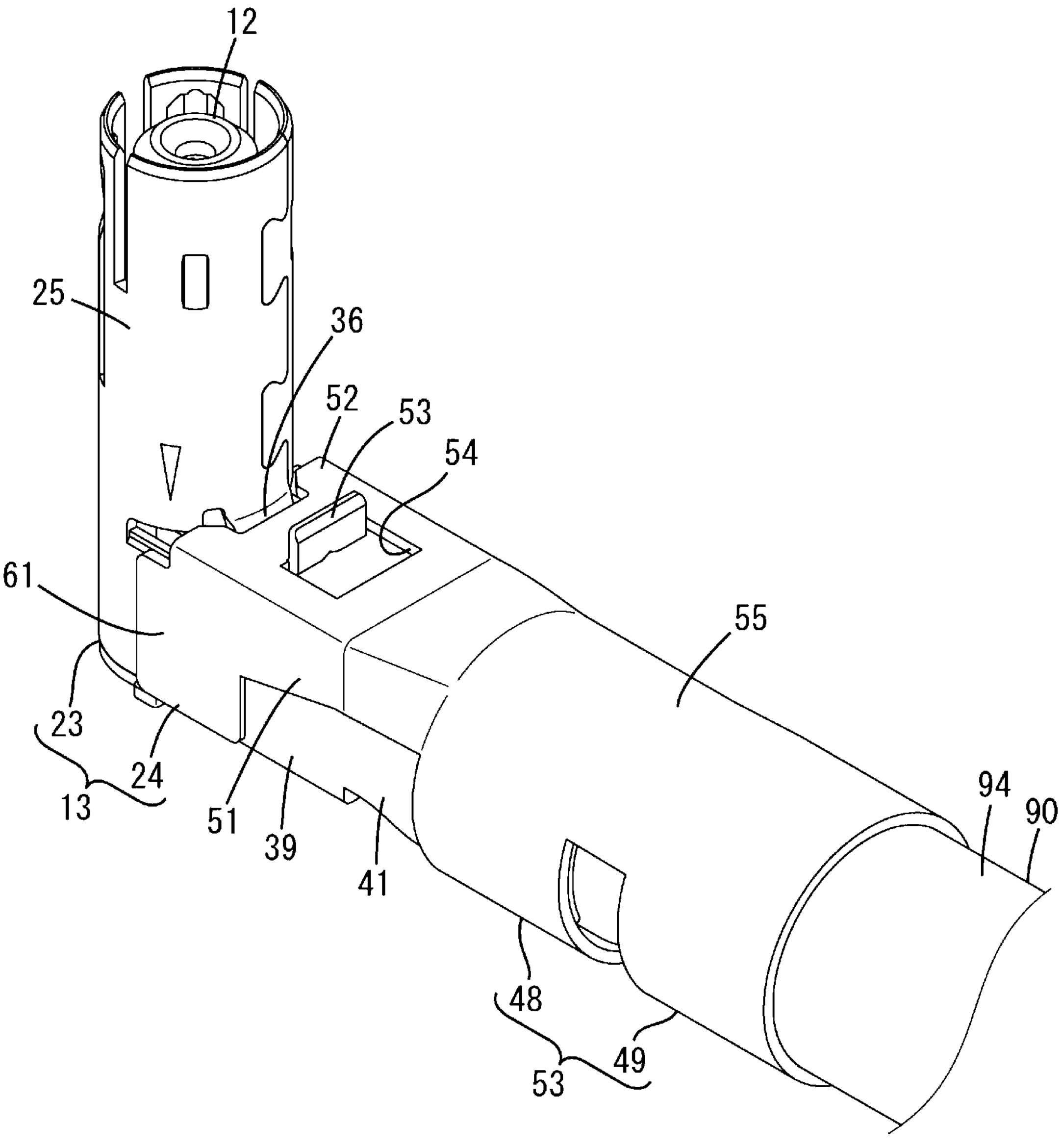
FIG. 11 is a perspective view of the shielded terminal connected to the shielded electrical wire.

Next, the attachment member 24 will be described. The attachment member 24 has a shape extending in the front-rear direction. As shown in FIGS. 1 and 11, the attachment member 24 is attached to the connection member 23 from above and is disposed so as to cover the outer surface of the extension part 26. As shown in FIGS. 5 and 6, the attachment member 24 has a base part 47, a pair of barrels 48, a pair of sheath barrels 49, and a pair of blocking parts 51.

The base part 47 has a band plate shape extending in the front-rear direction. A flat surface part 52 is provided at the front part of the base part 47. As shown in FIG. 11, the flat surface part 52 has a protruding piece part 53 formed by bending and raising a portion of the flat surface part 52. The protruding piece part 53 is fitted into an un-shown recess of a housing that houses the shielded terminal 10, and has the function of positioning the shielded terminal 10 in the housing. The flat surface part 52 has an opening part 54 formed by bending and raising the protruding piece part 53. The protruding piece part 53 is disposed along the horizontal direction and shaped so as to rise from the front end of the opening part 54. A reinforcement part 76 obtained by pushing out a portion of protruding piece part 53 from the opening part 54 side is provided on the front side of the lower end portion of the protruding piece part 53.

A rearward base part 55 is formed at the rear part of the base part 47. The barrels 48 each have a plate piece shape and respectively protrude downward from the left and right ends of the front part of the rearward base part 55. As shown in FIG. 1, the barrels 48 are crimped to the shield part 93 of the shielded electrical wire 90 with the electrical wire holding parts 43 therebetween. The shield part 93 is electrically connected to the outer conductor 13 in a state of being sandwiched between the electrical wire holding parts 43 and the sleeve 95.

The sheath barrels 49 each have a plate piece shape and respectively protrude downward from the left and right ends of the rear part of the rearward base part 55. The sheath barrels 49 are crimped to the sheath 94 of the shielded electrical wire 90. The sheath barrels 49 correspondingly have a recessed part 57 and a protruding part 58 at the leading ends thereof. In a state in which the sheath barrels 49 are connected to the sheath 94 of the shielded electrical wire 90, the sheath barrels 49 and the rearward base part 55 form a tubular shape, and the recessed part 57 and the protruding part 58 are matched and engaged with each other. At the rear part of the attachment member 24, the barrels 48, the sheath barrels 49, and the rearward base part 55 constitute the crimp part 59 in the present disclosure.

As shown in FIG. 5, the blocking parts 51 each have a plate piece shape and respectively protrude downward from the left and right side edges of the flat surface part 52. As shown in FIG. 11, the blocking parts 51 cover the outer surfaces of the side wall parts 39 and the lateral extension parts 41 to close the gap G1 (see FIG. 8) formed between the extension part 26 and the interposing part 27. The rear ends of the blocking parts 51 are coupled to the corresponding barrels 48. A pair of embracing pieces 61 with a rectangular shape in a side view are respectively formed at the front sides of the blocking parts 51. The embracing pieces 61 protrude downward more than the rear sides of the blocking parts 51 to close the gap G2 (see FIGS. 8 and 11) formed between the open ends 35 of the engagement parts 34 and the front ends of the side wall parts 39.

Attachment Method and Operation of Shielded Terminal

First, in the connection member 23, the interposing part 27 is brought to the open position with respect to the tubular part 25 (see FIGS. 3 and 4). In this state, the dielectric body 12 is inserted into the connection member 23 from below in the drawings (actually, from above). In the course of inserting the dielectric body 12, the protrusion 75 is positioned and fitted into the groove 74 (see FIG. 1). Upon completion of insertion of the dielectric body 12, the extension part 26 is positioned between the engaging parts 21 on the upper surface of the dielectric body part 17 and brought into contact therewith, and thus the operation of inserting the dielectric body 12 is stopped.

The lower wall 19 of the dielectric body part 17 is brought into the open state, and the inner conductor 11 is inserted into an inner conductor housing space 51 of the dielectric body 12 from below in the drawing (actually, from above). The inner conductor 11 is connected in advance to the terminal portion of the shielded electrical wire 90. Once the inner conductor 11 has been inserted into the dielectric body 12, the counterpart inner conductor connection part 15 is disposed inside the insertion part 16, and the core wire crimp part 14 is disposed inside the dielectric body part 17. Subsequently, the interposing part 27 is pivoted around the pivot center part 46 and brought to the closed position with respect to the tubular part 25 (see FIGS. 8 to 10).

The attachment member 24 is overlaid on the outside of the connection member 23 and the crimp part 59 of the attachment member 24 is set in a crimping die (not shown). In this state, the barrels 48 are pressed and deformed inward by a movable die (not shown). The electrical wire holding parts 43 are pressed and deformed inward by the barrels 48. Accordingly, the barrels 48 are crimped to the shield part 93 of the shielded electrical wire 90 via the electrical wire holding parts 43. As a result, the outer conductor 13 is electrically connected to the shield part 93 of the shielded electrical wire 90 (see FIGS. 1 and 11). The attachment member 24 is held to the connection member 23 by the barrels 48. The interposing part 27 is held by the barrels 48 in the closed position with respect to the tubular part 25.

Simultaneously with or before or after the crimping of the barrels 48, the sheath barrels 49 are crimped directly to the sheath 94 of the shielded electrical wire 90 and thus mechanically connected thereto. Since the un-shown movable die is arranged on the side on which the barrels 48 and the sheath barrels 49 are positioned, it is easy to avoid interference with the tubular part 25.

In the state in which the attachment member 24 is attached to the connection member 23 as described above, the gap G1 between the extension part 26 and the interposing part 27 is covered by the blocking parts 51 and the crimp part 59, and the gap G2 between the tubular part 25 and the interposing part 27 is also covered by the blocking parts 51. Since the extension part 26 and the tubular part 25 are continuous with each other in an L shape in a side view with the inner corner part 36 therebetween, no cut appears at the position of the inner corner part 36 (see FIG. 1). Thus, according to the first embodiment, it is possible to suppress the leakage of noise from the shielded terminal 10 and the intrusion of noise to the shielded terminal 10, thereby improving shielding performance. In particular, since the attachment member 24 is provided with the crimp part 59 and the connection member 23, which is different from the attachment member 24, is provided with the tubular part 25, it is possible to increase the degree of freedom in forming of the crimp part 59 and the tubular part 25. Accordingly, the barrels 48 of the crimp part 59 and the tubular part 25 can be disposed in proximity to each other in the front-rear direction, for example.

Second Embodiment

Figure 12:
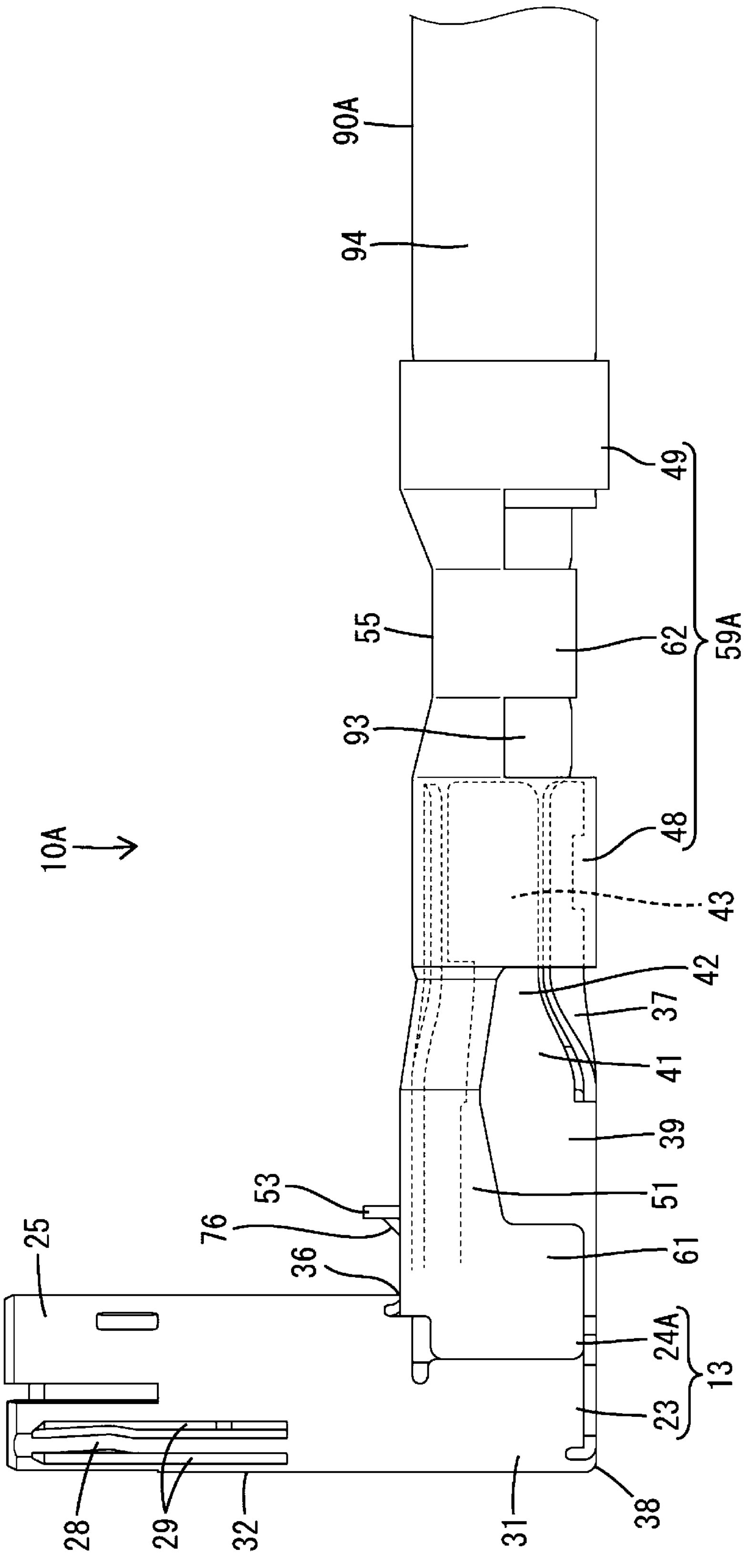
FIG. 12 is a side view of a shielded terminal connected to a shielded electrical wire in a second embodiment.

A shielded terminal 10A in a second embodiment is connected to a shielded electrical wire 90A that is smaller in diameter than the shielded electrical wire 90 in the first embodiment, as shown in FIG. 12. The shielded electrical wire 90A does not include an equivalent to the sleeve 95 in the first embodiment. The shielded terminal 10A in the second embodiment is different from the shielded terminal 10 in the first embodiment in that a crimp part 59A of an attachment member 24A is provided with second barrels 62 and the inclined parts 42 of the connection member 23 are inclined so as to be tapered toward corresponding electrical wire holding parts 43. Otherwise, the second embodiment is the same as the first embodiment, and thus components identical or equivalent to those in the first embodiment are given identical reference signs, and redundant description thereof will be omitted.

A pair of the second barrels 62 of the crimp part 59A are provided between the sheath barrels 49 and barrels 48. The second barrels 62 form an open barrel shape similar to the sheath barrels 49 and the barrels 48, and respectively protrude from left and right ends of the rearward base part 55.

The second barrels 62 are directly crimped and electrically connected to the shield part 93 of the shielded electrical wire 90A rearward of the connection member 23. The diameter of the tubular shape of the second barrels 62, more specifically, the diameter of a tubular shape formed by the second barrels 62 and the rearward base part 55 is made smaller than the diameters of tubular shapes formed by the barrels 48 and the sheath barrels 49.

According to the second embodiment, since the second barrels 62 are directly crimped to the shield part 93 of the shielded electrical wire 90A, it is possible to stably maintain the connection state between the shielded electrical wire 90A and the outer conductor 13.

Other Embodiments of Present Disclosure

It should be noted that the embodiments disclosed herein are examples in every respect and are not limiting.

In the first and second embodiments, the connection member is provided with a pair of lateral extension parts. However, in another embodiment, at least one of the pair of lateral extension parts may be omitted from the connection member.

In the first and second embodiments, the connection member is provided with the shield part. However, in another embodiment, the shield part may be omitted from the connection member.

In the first and second embodiments, the attachment member is provided with the sheath barrels. However, in another embodiment, the sheath barrels may be omitted from the attachment member. For example, the connection member may be provided with the sheath barrels.

In the first and second embodiments, the inner corner part connects the tubular part and the extension part at a right angle. However, in another embodiment, the inner corner part may curvedly connect the tubular part and the extension part.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A shielded terminal comprising an outer conductor connected to a shield part of a shielded electrical wire, wherein the outer conductor includes a connection member and an attachment member that is separate from the connection member, the connection member includes a tubular part and an extension part that extends in a direction intersecting the tubular part, the attachment member includes a crimp part that is crimped to the shielded electrical wire with the extension part interposed therebetween while covering an outer surface of the extension part, the extension part and the tubular part form an L shape in a side view, and are continuous with each other via an inner corner part formed between outer surfaces of the extension part and the tubular part, and the connection member includes, separate from the extension part, an interposing part that is bent and connected to the tubular part and is sandwiched between the shielded electrical wire and the crimp part.

2. The shielded terminal according to claim 1, wherein the crimp part includes a base part that is in contact with the outer surface of the extension part and a barrel that protrudes from the base part and surrounds the shielded electrical wire, and a side of the base part on which the barrel is positioned and a side of the base part on which the tubular part is positioned are opposite to each other.

3. The shielded terminal according to claim 1, wherein the crimp part includes a blocking part that closes a gap formed between the extension part and the interposing part.

4. A shielded terminal comprising an outer conductor connected to a shield part of a shielded electrical wire, wherein the outer conductor includes a connection member and an attachment member that is separate from the connection member, the connection member includes a tubular part and an extension part that extends in a direction intersecting the tubular part, the attachment member includes a crimp part that is crimped to the shielded electrical wire with the extension part interposed therebetween while covering an outer surface of the extension part, the extension part and the tubular part form an L shape in a side view, and are continuous with each other via an inner corner part formed between outer surfaces of the extension part and the tubular part, wherein an insulating dielectric body is disposed between the outer conductor and an inner conductor, wherein the dielectric body includes an insertion part that is disposed inside the tubular part and a dielectric body part that extends in a direction intersecting the insertion part and is disposed along the extension part, wherein the connection member includes an opposing extension part at a position opposing the extension part, and wherein the opposing extension part and the tubular part form an L shape in a side view and are continuous via an outer corner part formed between outer surfaces of the opposing extension part and the tubular part.

5. The shielded terminal according to claim 4, wherein the opposing extension part is capable of pivoting to an open position and a closed position around the outer corner part with respect to the tubular part, the inside of the tubular part is open at the open position.

6. A shielded terminal comprising an outer conductor connected to a shield part of a shielded electrical wire, wherein the outer conductor includes a connection member and an attachment member that is separate from the connection member, the connection member includes a tubular part and an extension part that extends in a direction intersecting the tubular part, the attachment member includes a crimp part that is crimped to the shielded electrical wire with the extension part interposed therebetween while covering an outer surface of the extension part, the extension part and the tubular part form an L shape in a side view, and are continuous with each other via an inner corner part formed between outer surfaces of the extension part and the tubular part, the connection member includes, separate from the extension part, an interposing part, and the crimp part includes a blocking part that closes a gap formed between the extension part and the interposing part.

7. The shielded terminal according to claim 6, wherein an insulating dielectric body is disposed between the outer conductor and an inner conductor.

8. The shielded terminal according to claim 6, wherein the dielectric body includes an insertion part that is disposed inside the tubular part and a dielectric body part that extends in a direction intersecting the insertion part and is disposed along the extension part.

* * * * *